United States Patent [19]
Menefee et al.

[11] 3,798,448
[45] Mar. 19, 1974

[54] SCINTILLATION METER-TYPE SPECTROMETER

[75] Inventors: Julious M. Menefee, Novelty; William P. Novak, Middlefield; John A. White, Eastlake, all of Ohio

[73] Assignee: Bicron Corporation, Newbury, Ohio

[22] Filed: May 11, 1972

[21] Appl. No.: 252,193

[52] U.S. Cl. ............... 250/71.5 R, 250/83 R
[51] Int. Cl. ................................. G01j 39/18
[58] Field of Search ...................... 250/71.5 R

[56] References Cited
UNITED STATES PATENTS
3,102,955  9/1963  Carlson ................ 250/71.5 R
3,030,509  4/1962  Carlson ................ 250/71.5 R
3,087,060  4/1963  Omohundro .......... 250/71.5 R
2,666,145  1/1954  Eversole et al. ...... 250/71.5 R Primary Examiner—Harold A. Dixon
Attorney, Agent, or Firm—Bosworth, Sessions & McCoy

[57] ABSTRACT

An improved scintillation meter component for a radiation detector having a photomultiplier tube optically coupled to a solid scintillation crystal. The crystal is coated with an optical decoupling agent to balance the light output sensed by the photocathode.

4 Claims, 6 Drawing Figures

SCINTILLATION METER-TYPE SPECTROMETER

BACKGROUND OF THE INVENTION

Field of the Invention

The present invention relates to improved components for a radiation detector of the scintillation meter type.

Scintillation meters are radiation detectors which function by converting radiant energy of the order of gamma radiation, for example, into visible light energy and thence into a measurable electric signal. The basic components of the scintillation meter are a scintillation crystal, a photomultiplier tube mounted thereon and a means for recording the electric impulse generated by the phototube. In practice gamma ray photons from a source of radiation strike the crystal causing flashes of light to occur. The flashes of light or scintillations are directed to the photomultiplier tube where they are converted into an electric current at the photocathode and then amplified by a system of secondary emitting electrodes within the tube. The current output from the photomultiplier tube is sent to electronic devices which process and display the information contained in the output current.

A most important property of a gamma ray scintillation spectrometer is its resolving power. That is, its ability to display as separate peaks in the output spectrum for two gamma rays whose energy differential is small. The ideal gamma ray scintillation spectrometer would yield a single line of zero width in the output spectrum for monoenergetic incident gamma rays. However, in practical spectrometers there is an instrumental line width to contend with. This instrumental line width limits the resolving power (the ability to separate closely spaced lines) of the spectrometer.

The instrumental line width in gamma ray scintillation spectrometers is affected by several factors. Among these is the variation in light which is collected by the photocathode due to the variation in position of the scintillation event. What one observes is a variation in pulse height as a point source of gamma radiation is moved over the surface area of the crystal. These variations of pulse height mean that some regions of the crystal are sensed by the photocathode as generating a higher light output than others. If the light output was reduced by bleeding out of the crystal, some of the light output in regions of high output, the effect would be that every region of the crystal would be sensed by the photocathode at the same response level as equal. This balancing of visible light output would reduce the instrumental line width.

It is, therefore, an object of this invention to provide an improved scintillation meter component by balancing the visible light output sensed by the photocathode from scintillation events in different areas of the scintillation phosphor.

It is another object of this invention to provide improved balancing of light output by bleeding light photons out of the crystal at the necessary regions.

It is another object of this invention to provide a balancing of light output which is easily reproducible in large production.

It is another object of this invention to provide a balancing of light output in a manner which is inexpensive, fast and requires little handling of the crystal. This is particularly important with the hygroscopic crystal, i.e., NaI.

It is another object of this invention to provide a balancing of light output throughout the entire mass of a crystal of complex geometric shape as well as a crystal of the standard right cylinder geometry.

It is another object of this invention to balance the light output on long crystals.

THE PRIOR ART

The problem of non-uniform pulse height response over the volume of the crystal has been recognized in the art, as disclosed in U. S. Pat. No. 3,102,955 of Carlson.

A better understanding of the invention may be had from a discussion of the problem.

Figure 1:
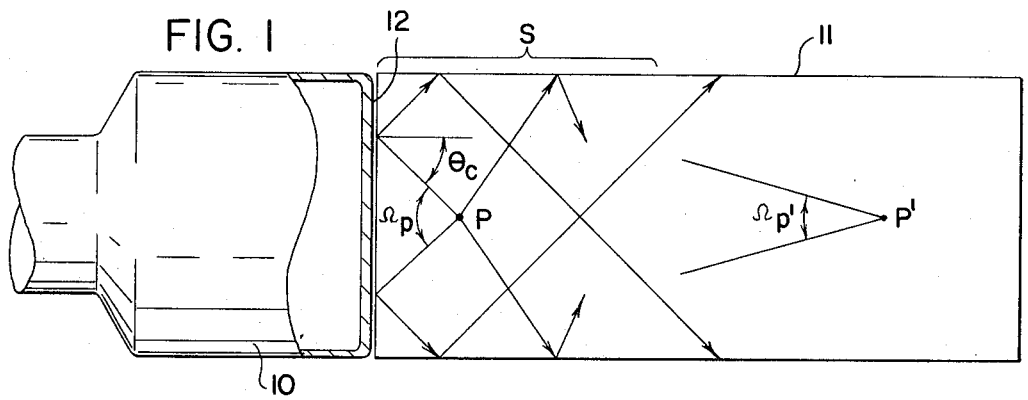
FIG. 1 is an elevational view of scintillation meter components with parts broken away and shown in section and with portions shown in diagrammatic form to illustrate conditions typical of the prior art.

Referring to FIG. 1, consider a scintillation event of unit gamma ray energy deposition at the point P. The amount of light that directly reaches the photocathode 10 is that defined by the solid angle $\Omega_p$. This solid angle is limited by the semi-apex angle $\theta_c$, which is the critical angle for total internal reflection as determined by the indices of refraction of the crystal 11 and the interface 12 between the crystal 11 and the phototube 10. The rest of the light emitted at point P has the solid angle $4\pi - \Omega_p$ and is directed toward the reflecting surface of the crystal 11 either directly or after a total internal reflection from the crystal-phototube interface. This light eventually reaches the photocathode but attenuated in intensity by the light collection efficiency (L) of the reflector system. Assume for the moment that L is constant for the system. Hence, the total amount of light reaching the photocathode 10 from point P is:

$$\phi_p = \phi \ [\ \Omega_p/4\pi + (4\pi - \Omega_p)/4\pi \cdot L \ ]$$

(1)

where $\phi$ represents the total amount of light produced at P.

At the point P', however, the amount of light directly reaching the photocathode 10 is defined by the solid angle $\Omega_p'$. This angle is limited by the photocathode diameter and not by the critical angle as was the case at point P. As before, the reflected light reaches the photocathode 10 with the light collection efficiency L and the total amount of light reaching the photocathode from the point P' is:

$$\phi_{p'} = \phi [ \Omega_{p'} /4\pi - (4\pi - \Omega_{p'})/4\pi \cdot L ]$$

(2)

Since $\Omega_p'$ is different from $\Omega_p$, and since Equations 1 and 2 differ on the right-hand side only by $\Omega_p'$ and $\Omega_p$, obviously $\phi_p$ is different from $\phi_p'$. Thus, equivalent energies deposited at P and O will result in different output pulses from the phototube 10 and the spectrometer will indicate different energy levels where actually equal energy levels occurred.

In the example shown, if the photocathode 10 had a perfectly uniform response, there would be no variation in output pulse for equal energy events on the axis of the crystal 11 up to the point where the critical angle limitation and the photocathode diameter limitation are equal. From that point to the end of the crystal 11 a steady variation in output pulse due to the variation in solid angle to the phototube 10 would be expected. This then is the origin of the variation in light collection contribution to the instrumental line width in gamma ray spectrometers.

The example cited, however, represents a hypothetical ideal circumstance rather than actual circumstances for two reasons: First, current photocathodes are not uniform and second, the light collection efficiency (L) can be shown to be a function of position in the volume of the crystal and not a constant as assumed.

The equipment disclosed in U. S. Pat. No. 3,102,955 compensates for this variation in light sensed by the photocathode in that it applies the principle of light piping by altering the reflectivity of the surface of the crystal. This technique is based primarily on polishing a portion (e.g., S) of the crystal surface, thereby causing specular reflection of a light photon along the solid angle $4\pi - \Omega_p$ and thus reducing the light intensity read by the photocathode.

Light photons are specularly reflected by the polished surface and are trapped within the crystal and piped to the opposite end. These light photons may still reach the photocathode after multiple reflections to the opposite end and back to the photocathode.

SUMMARY OF THE INVENTION

While this technique served well at the time, we have found it to have limited use as the technology of scintillation meters progressed. First, we found that as the length of a right cylinder crystal was increased we often encountered a situation where no matter how good the polish the response function could not be made uniform. In effect, the practical limitation of light piping in the crystal would not balance the light photon reaching the photocathode from a scintillation event at point P with a scintillation event at point P' when the distance between point P and P' was increased.

Figure 3:
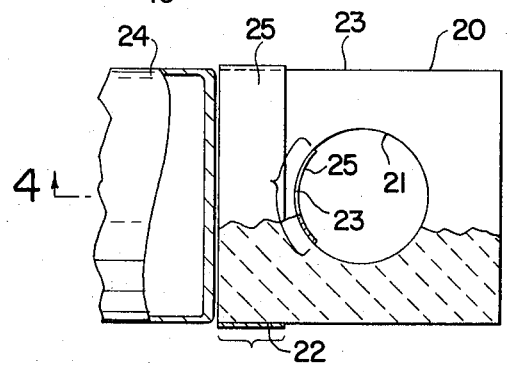
FIG. 3 is a fragmentary sectional view with parts broken away and shown in section, of the assembly of FIG. 2.
Figure 4:
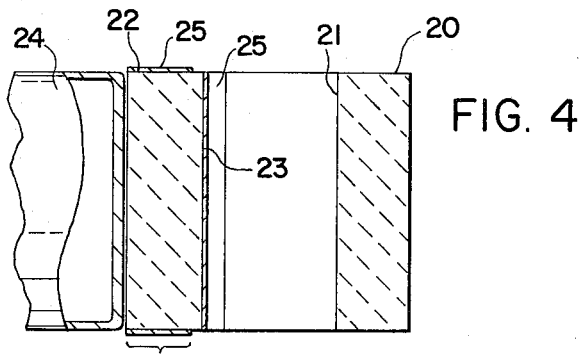
FIG. 4 is a fragmentary sectional view taken on the line 4—4 of FIG. 3.

Secondly, as crystal cutting capabilities progressed, the shape of the crystals changed from the simple right cylinder geometry. A very popular geometry of scintillation meters currently used in the art is shown in FIGS. 3 and 4. This is a right cylinder crystal with a bored cavity extending through the crystal perpendicular to the length of the cylinder. This has the advantages of allowing the radiation-emitting sample to be placed inside the crystal substantially increasing the counting efficiency. The polishing technique disclosed in U. S. Pat. No. 3,102,955 will have a very limited effect in balancing the light photon reached by the photocathode from scintillation events in the various regions of this crystal.

We have found that by intentionally letting light photons escape from the crystal in those regions where the intensity is too great, that we can balance the light output from the various regions of the crystal. We have found that by coating the crystal with an optical decoupling agent with a refractive index in a certain relation to that of the crystal, we can balance the light collection sensed by the photocathode to be equal for equal energy scintillation events in various regions of the crystal.

DESCRIPTION OF TYPICAL EMBODIMENTS

Figure 2:
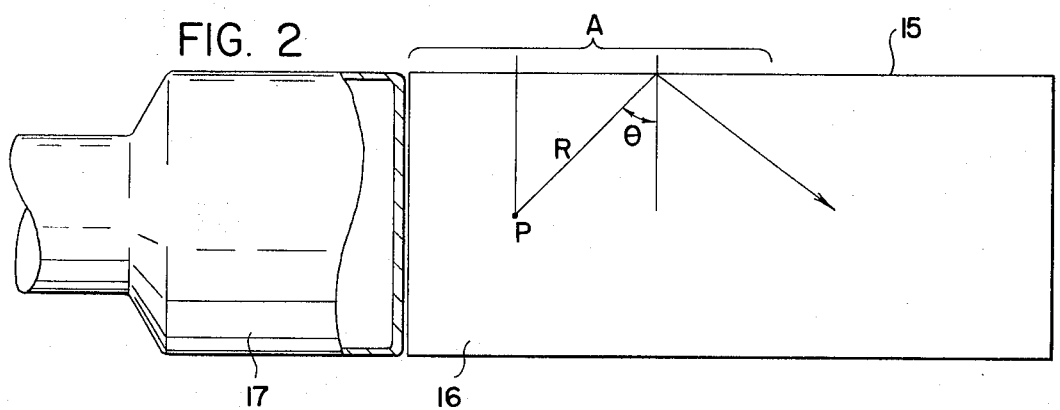
FIG. 2 is an elevational view similar to FIG. 1 with parts broken away and shown in section and with portions shown in diagrammatic form to illustrate conditions reflecting the invention.

FIG. 2 shows a crystal using our invention and representing a situation similar to that discussed above in FIG. 1. Point P is a source of a scintillation event in which light photons are produced. R represents one of the paths which would be followed by the photons emanating from this gamma ray absorption. $n$ represents the refractive index of the crystal (inside of which the scintillation event takes place) and $n'$ represents the refractive index of the region outside the crystal. Snell's law provides in part that the critical angle at which total internal reflection occurs between any two substances is given by the relationship:

$$\sin \theta = n'/n$$

Using, for example, a sodium iodide crystal, a very popularly used scintillation crystal, the refractive index of $n$ is 1.68. The region outside the crystal is air, thus $n'$ has a refractive index of 1.00. In this case $\sin \theta = 0.5952$ and therefore $\theta = 36.5$. This means that any photon striking the crystal surface along some path R with an angle of incidence greater than 36.5° is totally internally reflected and thereby trapped in the crystal.

We have found that by coating a portion of the crystal with an optical decoupling agent, i.e., epoxy, paint, acrylics, oils, etc., we can greatly increase the angle of total reflectivity and thereby reduce the internal reflection of light photons.

Referring again to FIG. 2 and assuming for the purpose of illustrating the invention, that the crystal 15 is sodium iodide, region A on the lateral portion of this right cylinder crystal is coated with an optical substance 16 with a refractive index of 1.50. Thus $n$ is 1.68, $n'$ is 1.50 which results in $\sin \theta = 0.8929$ and $\theta = 63.2°$. In this case almost no light will be totally internally reflected in region A, which is generally the area of high intensity. We have, in effect, bled out most of the light photons produced at point P except those which strike the photocathode 17 directly or emanate in the direction opposite the photocathode. We have found that in the practice of our invention we can balance a simple right cylinder crystal, a long right crystal, a composite crystal (one or more crystals cemented together) and a wide variety of geometric shaped crystals.

We have also found that multiple coatings of optical agents can be advantageously used to further balance the crystal. For a long right cylinder crystal, it may be necessary to coat the lateral portion of the crystal adjacent the photocathode with one optical decoupling agent and to coat the intermediate portion of the crystal with a different optical decoupling agent having a different refractive index, to balance the light photons sensed by the photomultiplier tube for equal energy scintillation events in the various regions of the crystal mass.

Multiple coatings or layers of optical coating may further let the light photon out of the crystal volume. Multiple layers of optical decoupling agent with different refractive indices and a variety of combination can be used to properly balance the crystal. Also altering the optical properties of the decoupling agent itself may be necessary to balance the light intensity.

EXAMPLE

A sodium iodide scintillation crystal 20 was cut in a through-the-side-well, geometric shape as shown in FIGS. 3 and 4. This is a right cylinder crystal with a 1 ¾ inch diameter and 2-inch length and a ⅝-inch transverse bore 21.

Sodium iodide is well known to be hygroscopic and is further finished to shape in a dry box. The crystal 20 was then sanded to remove the hydrate. Also, the exterior surface portion identified by the numeral 23 and the surface portion of the bore 21 identified by the numeral 23 were polished as is customary in the art.

Then the resulting crystal 20 was optically coupled to the photomultiplier tube 24 and placed in a complete scintillation meter assembly. The assembly thus prepared was tested using a Cesium-137 radioactive sample as an equal energy gamma ray source.

Figure 6:
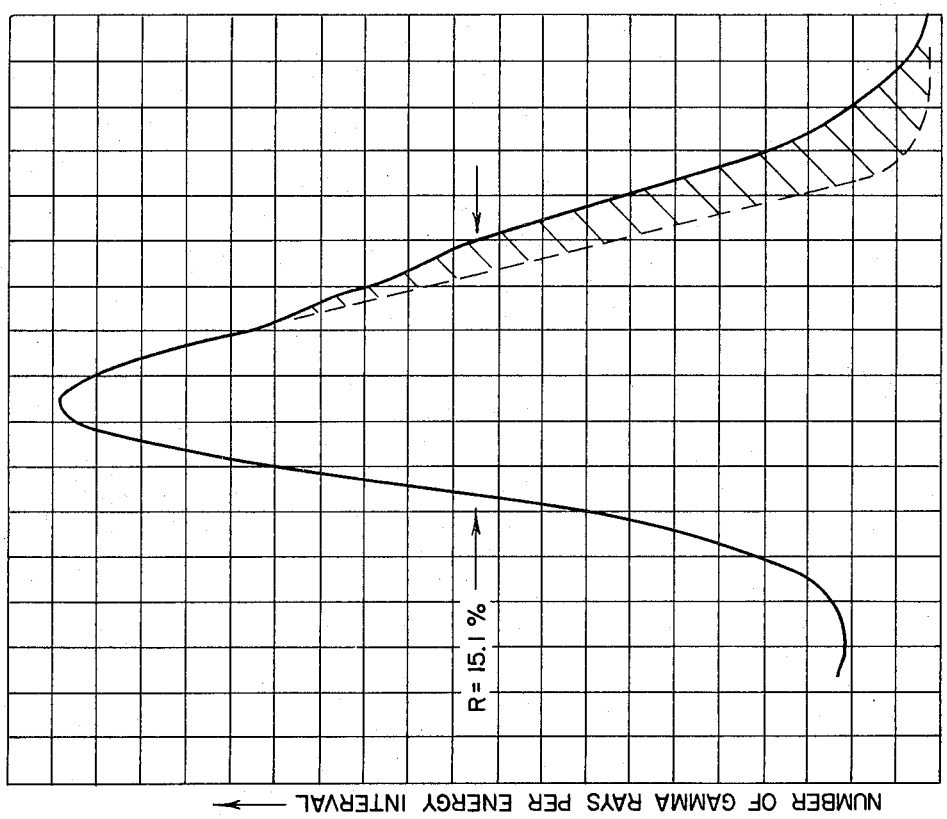
FIG. 6 is a histogram similar to FIG. 5.

FIG. 6 is the spectrum or histogram of the equal energy gamma ray test. The distortion on the right-hand side of the peak shown by the hatched portion should indicate a double peak, but under the control conditions of the test, it is predetermined that the scintillation meter is sensing equal energy gamma rays. The practice is to express the line width or resolution of a gamma ray peak by dividing its width at half its height by the total energy of the peak.

$$R = (\Delta E)/E$$

The resolution of the peak in FIG. 6 is 15.1 percent. It is believed that this is not an acceptable resolution.

Figure 5:
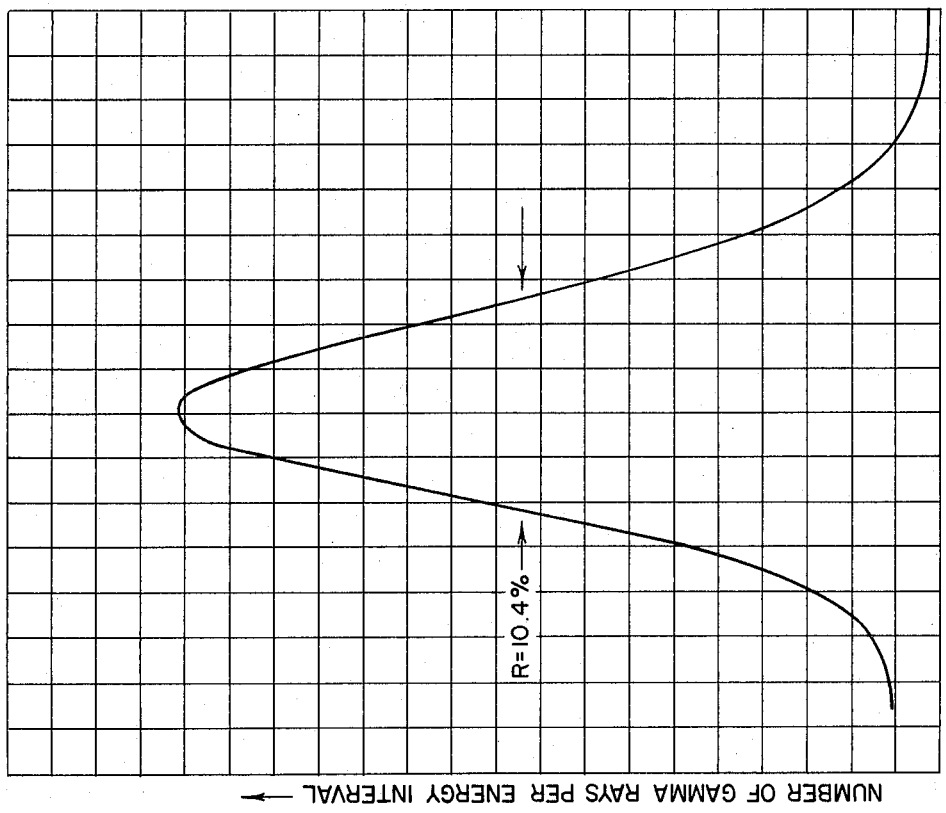
FIG. 5 shows a histogram wherein the number of gamma rays emitted per energy interval is plotted on the vertical axis against the gamma ray energy level on the horizontal axis.

The same crystal 20 was refinished to embody the invention. The crystal 20 was sanded to remove the polish and then the exterior surface portion identified by the numeral 22 and the surface portion of the bore 21 identified by the numeral 23 were coated with an optical decoupling agent 25. The exterior surface portion was ½ inch in width whereas in the previous test the polished width was slightly wider. A thin coating of epoxy resin (Biggs Co. Resin R 313) with a refractive index of 1.562 was used as the optical decoupling agent. The crystal 20 was then mounted in a complete scintillation meter just as was done in the previous test. Again, as in the previous test, the resolution was measured using an equal energy gamma ray source of Cesium-137. The resulting spectrum is shown in FIG. 5. It is observable that the distortion on the right-hand side of the curve of FIG. 6 has been balanced in FIG. 5 and the specular line takes the shape of normal distribution for an equal energy source.

The spectrum of the invention shown in FIG. 5 has reduced the pulse or peak height to the normal level. In comparing the pulse height of FIGS. 5 and 6, it is observed that a greater than normal output pulse is sensed in FIG. 6. It is believed that the distortion in the prior art test shown in FIG. 6 is due to scintillation events occurring directly in front of the photocathode and the phototube 24 collects more light photons and thereby gives a greater output pulse than scintillation events occurring in the regions of the crystal 20 farther away from the phototube 24. The pulse height in FIG. 5, the test directed to the improvement of the invention, has been reduced to a more desirable value. The light photons produced by a scintillation event occurring directly in front of the phototube 24 have been optically decoupled or bled out of the crystal to balance the light photons sensed by the photocathode with that of a scintillation event in regions of the crystal 20 further from the phototube 24. The resolution of the spectrum of the invention is 10.4 percent which is believed to be a very acceptable value.

While the invention has been shown and described with respect to some typical embodiments thereof, this is for the purpose of illustration rather than limitation and other variations and modifications of the specific form herein shown and described will be apparent to those skilled in the art, all within the intended spirit and scope of the invention. Accordingly, the patent is not to be limited to the typical embodiments herein shown and described nor in any other way that is inconsistent with the extent to which the progress in the art has been advanced by the invention.

We claim:

1. In a scintillation meter component including a solid, generally cylindrical scintillation crystal and a photomultiplier tube optically coupled to an end face of said crystal, the improvement which comprises:
   a coating of optical-reflection-reducing material with a refractive index of about 1.5 applied to a surface portion of said crystal, said portion comprising a cylindrical band extending from said end face across a uniform axial width equal to less than one half the axial length of said crystal.

2. A device as recited in claim 1 further including a second coating of optical-reflection-reducing material with a refractive index greater than 1 and less than 1.5 applied to another surface portion of said crystal, said other portion comprising a cylindrical band extending from said first-named band across a uniform axial width equal to less than one half the axial length of said crystal.

3. A device as recited in claim 1 wherein said optical-reflection-reducing material comprises an epoxy resin.

4. A device as recited in claim 1 wherein said crystal has a circular opening extending transversely therethrough with an axis perpendicular to the crystal axis, for receiving a source of particle emission, and further including a coating of said optical-reflection-reducing material applied to an interior surface portion of said opening, said portion comprising an axial zone extending the length of said opening and across a uniform width equal to less than a 180° circumferential arc of said bore, said arc being located between said inner end face of said crystal and the axis of said bore.

* * * * *